United States Patent [19]

Gilligan

[11] Patent Number: 4,974,089

[45] Date of Patent: Nov. 27, 1990

[54] TELEVISION CAMERA APPARATUS USING GRADIENT INDEX ROD LENS

[75] Inventor: Lawrence H. Gilligan, Charlottesville, Va.

[73] Assignee: Sperry Marine Inc., Charlottesville, Va.

[21] Appl. No.: 298,456

[22] Filed: Jan. 18, 1989

[51] Int. Cl.⁵ .......................................... H04N 51/235
[52] U.S. Cl. ..................................... 358/211; 358/217
[58] Field of Search .................... 358/211, 213.13, 217; 250/213 VT

[56] References Cited

U.S. PATENT DOCUMENTS

| | | | |
|---|---|---|---|
| 2,929,866 | 3/1960 | Melamed | 358/211 |
| 4,611,920 | 9/1986 | Tsuchiya | 358/211 |
| 4,704,634 | 11/1987 | Kato et al. | 358/217 |
| 4,717,965 | 1/1988 | Mashiko et al. | 358/473 |

Primary Examiner—Stephen Brinich
Attorney, Agent, or Firm—Seymour Levine

[57] ABSTRACT

A gradient index rod lens is utilized to focus the intensified output image from an image intensifier onto the sensor surface of a focal plane array assembly through the window or filter of the focal plane array assembly.

5 Claims, 1 Drawing Sheet

TELEVISION CAMERA APPARATUS USING GRADIENT INDEX ROD LENS

BACKGROUND OF THE INVENTION

1. Field of the Invention

The invention relates to low light level television (LLL/TV) cameras particularly with respect to apparatus utilizing a focal plane array optically coupled to an image intensifier.

2. Description of the Prior Art

LLL/TV sensors of present day design utilize an image intensifier with the output image thereof optically coupled to a solid state focal plane array sensor. Preferably, a second-generation image intensifier is utilized having a gateable input photocathode with an input image plane, a microchannel plate and an output phosphor with an output image plane. An input image is focussed on the input image plane, the photons of the input image resulting in electrons emitted from the photocathode. The microchannel plate accelerates the electrons to impinge upon the phosphor output resulting in an intensified image on the output image plane. Thus, the image intensifier provides a luminous gain to the input image. The output image is formed on the CRT-type phosphor which is typically green. The focal plane array generally comprises a matrix of charge coupled devices (CCD).

Two methods are utilized in the prior art to relay the output image from the image intensifier phosphor image plane to the focal plane array. A conventional lens system or a section of coherent fiber optic image conduit material is utilized. The relay lens apparatus, utilizing conventional lenses, results in an assembly which is unacceptably large and heavy. Additionally, such assemblies tend to have alignment and focus problems and are not mechanically rugged.

With the fiber optic approach, the output face of the fiber optic bundle is fastened to the focal plane array and the input face thereof is contacted to the image intensifier output to relay the intensified image. Although the fiber optic method operates adequately, the fiber optic bundle requires intimate contact with the focal plane array surface. Any space larger than several thousandths of an inch results in defocussing. A commercially procurable focal plane array is mounted in a housing having a transparent input window such as glass. The prior method traditionally utilized to combine the image intensifier and the focal plane array into an LLL/TV sensor required that the focal plane array window be removed and the fiber optic image conduit be cemented, or otherwise attached, directly to the semiconductor surface. The focal plane arrays are often damaged in the fiber optic attachment process resulting in an unacceptably low yield.

In addition to the above, a new state of the art class of improved focal plane arrays are currently available which render fiber optic coupling impossible. The new focal plane arrays have a glass filter element cemented directly on the focal plane array semiconductor surface, so that intimate contact therewith by the fiber optic conduit is impossible. The glass filters are typically fifty-thousandths of an inch thick and would result in defocussing were the fiber optic bundle attached thereto.

SUMMARY OF THE INVENTION

The above-described disadvantages of the prior art are obviated by relaying the output image from the image intensifier phosphor onto the sensor surface of the focal plane array by means of a gradient index rod lens (GRIN rod lens).

The image from the rod lens is focussed on the focal plane array surface passing through any windows or filters installed in the focal plane array assembly. Thus, an LLL/TV camera sensor may be fabricated utilizing a focal plane array of any construction.

DESCRIPTION OF THE PREFERRED EMBODIMENT

Figure 1:
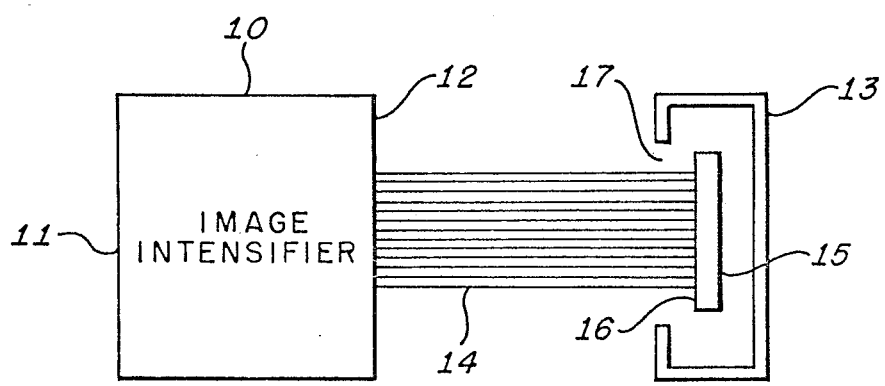
FIG. 1 a schematic diagram of the LLL/TV construction of the prior art.

Referring to FIG. 1, an image intensifier 10 having an input image plane 11 and an output phosphor image plane 12 is optically coupled to a focal plane array assembly 13 via a coherent fiber optic image conduit 14. The focal plane array assembly 13 includes a focal plane array 15 with a silicon sensor surface 16. The focal plane array window is removed leaving an aperture 17 and the fiber optic image conduit 14 is cemented or otherwise attached to the semiconductor surface 16 to relay the intensifier phosphor image from the phosphor output 12. It is appreciated that the assembly of FIG. 1 suffers from the disadvantages described above.

Figure 2:
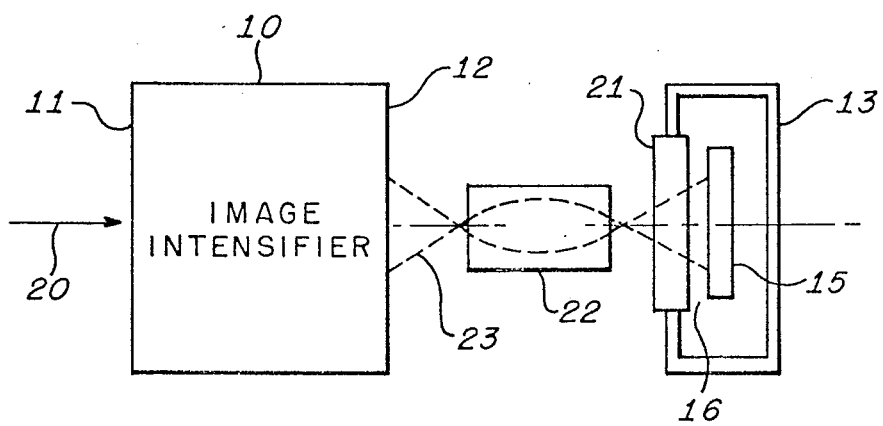
FIG. 2 is a schematic diagram of the LLL/TV construction in accordance with the present invention.

Referring to FIG. 2, in which like reference numerals indicate like components with respect to FIG. 1, an LLL/TV sensor is illustrated constructed in accordance with the present invention. The input image depicted by an arrow 20 impinges on the input image plane 11 of the image intensifier 10 resulting in an intensified image at the phosphor image plane 12. The focal plane array assembly 13 includes a window and/or filter 21 through which the image is transmitted to impinge on the silicon sensor surface 16. In the previous generation of focal plane array sensors, the window 21 is mounted in the focal plane array assembly and must be removed to implement the construction illustrated in FIG. 1. In the latest generation focal plane array assembly, the window or filter 21 is cemented to the silicon sensor surface 16 rendering the construction method of FIG. 1 impossible.

In accordance with the present invention, a gradient index rod lens 22 relays the image from the phosphor image plane 12 through the window or filter 21 to the silicon sensor surface 16 as illustrated by ray-trace lines 23. The gradient index rod lens 22 is commercially available and is preferably chemically manufactured having an index of refraction that varies radially in a section of glass of cylindrical shape. Unlike a conventional lens that bends and controls light rays utilizing a material of homogeneous index of refraction with curved surfaces, the gradient index rod lens 22 performs the same function utilizing the radially varying index of refraction. The application of such gradient index rod lenses has been limited since the lenses tend toward short focal lengths and the correction of chromatic aberrations is substantially impossible. These normally undesirably characteristics are, however, compatible with the application of the present invention as illustrated in FIG. 2.

By utilizing the rod-type gradient index lens 22, the image output of the image intensifier 10 is readily focussed or relayed onto the silicon sensor surface 16 of the focal plane array 15 in a space of less than 3 centimeters. The rod lens 22 may, for example, be as small as 4-6 millimeters in diamater and 10-12 millimeters in length. Thus, sufficient space is provided between the lens 22 and the focal plane array assembly 13 to accommodate package sizes and windows or filters of commercially available focal plane array assemblies.

The present invention utilizes the gradient index rod lens 22 instead of either a conventional lens or the fiber optic image conduit 14 of FIG. 1. The conventional lens as compared to the fiber optic image conduit has the advantage of controlling light rays in space rather than in solid material. This advantage is retained by the gradient index rod lens 22 but the size and complexity of the assembly is comparable to the fiber optic device. The gradient index lens 22 is mounted between the image intensifier 10 and the focal plane array 15. Because the lens 22 is very small and readily adapts to a short focal length with large numerical aperture, the lens 22 can relay the output image from the image intensifier 10 onto the focal plane array surface 16 in the same space required by fiber optics. Thus, because of the short focal length and high numerical aperture of the lens 22, the angular field of view and the image size provided permits the space between the intensifier 10 and the array 13 to be very short. Since the intensifier image is monochrome, one simple lens functions satisfactorily despite chromatic aberrations.

Figure 3:
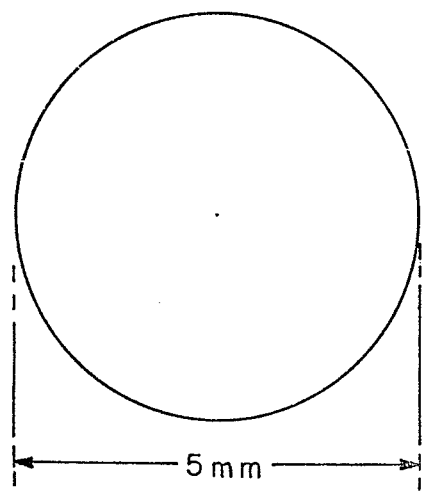
FIG. 3 is a schematic cross-sectional representation of a monolithic GRIN rod lens.
Figure 4:
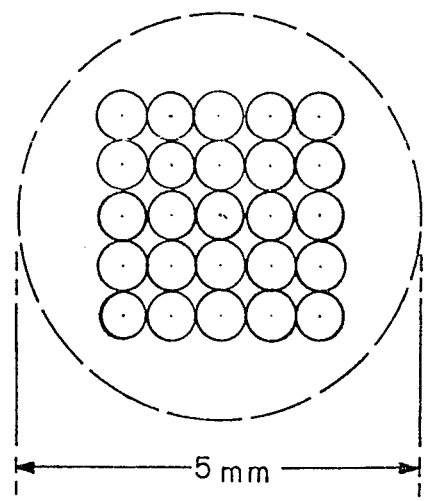
FIG. 4 is a schematic cross-sectional representation of a GRIN lens utilizing an array of GRIN rod lenses.

Referring to FIGS. 3 and 4, schematic cross-sectional representations of GRIN rod lenses that may be utilized in implementing the present invention are illustrated. FIG. 3 represents a single monolithic GRIN rod lens which is, for example, 5 millimeters in diameter. FIG. 4 illustrates an array of 25 GRIN rod lenses which are each 1 millimeter in diameter. The optical results of utilizing the lens of FIG. 3 or the lens of FIG. 4 are identical.

Although the present invention obviates the problems described above with respect to the present generation of focal plane array types having a filter cemented to the silicon sensor surface, utilizing the present invention also obviates the yield problems associated with the previous generation focal plane arrays which are adaptable to fiber optic image relaying. Additionally, the relative placement of the elements 10, 22 and 13 may be varied to obtain image magnification or reduction as required in specific applications.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Low light level television camera sensor apparatus comprising:

image intensifier means for providing an intensified image, gradient index rod lens means light coupled to said image intensifier means for focussing said intensified image from said image intensifier means onto a predetermined plane, a focal plane array assembly having a focal plane array sensor surface at said predetermined plane such that said gradient index rod lens means focuses said intensified image on said sensor surface and a transparent window disposed between said gradient index rod lens means and said focal plane array sensor surface, said gradient index rod lens means focussing said intensified image on said surface through said window.

2. The apparatus of claim 1 wherein said window is cemented to said surface.

3. The apparatus of claim 1 wherein said image intensifier means, said gradient index rod lens means and said focal plane array means are disposed with respect to each other so that image magnification or reduction is effected.

4. The apparatus of claim 1 wherein said gradient index rod lens means comprises a monolithic gradient index rod lens.

5. The apparatus of claim 1 wherein said gradient index rod lens means comprises an array of gradient index rod lenses.

* * * * *